T. Parkinson,
Horse Collar,
Nº 2,183. Patented July 17, 1841.
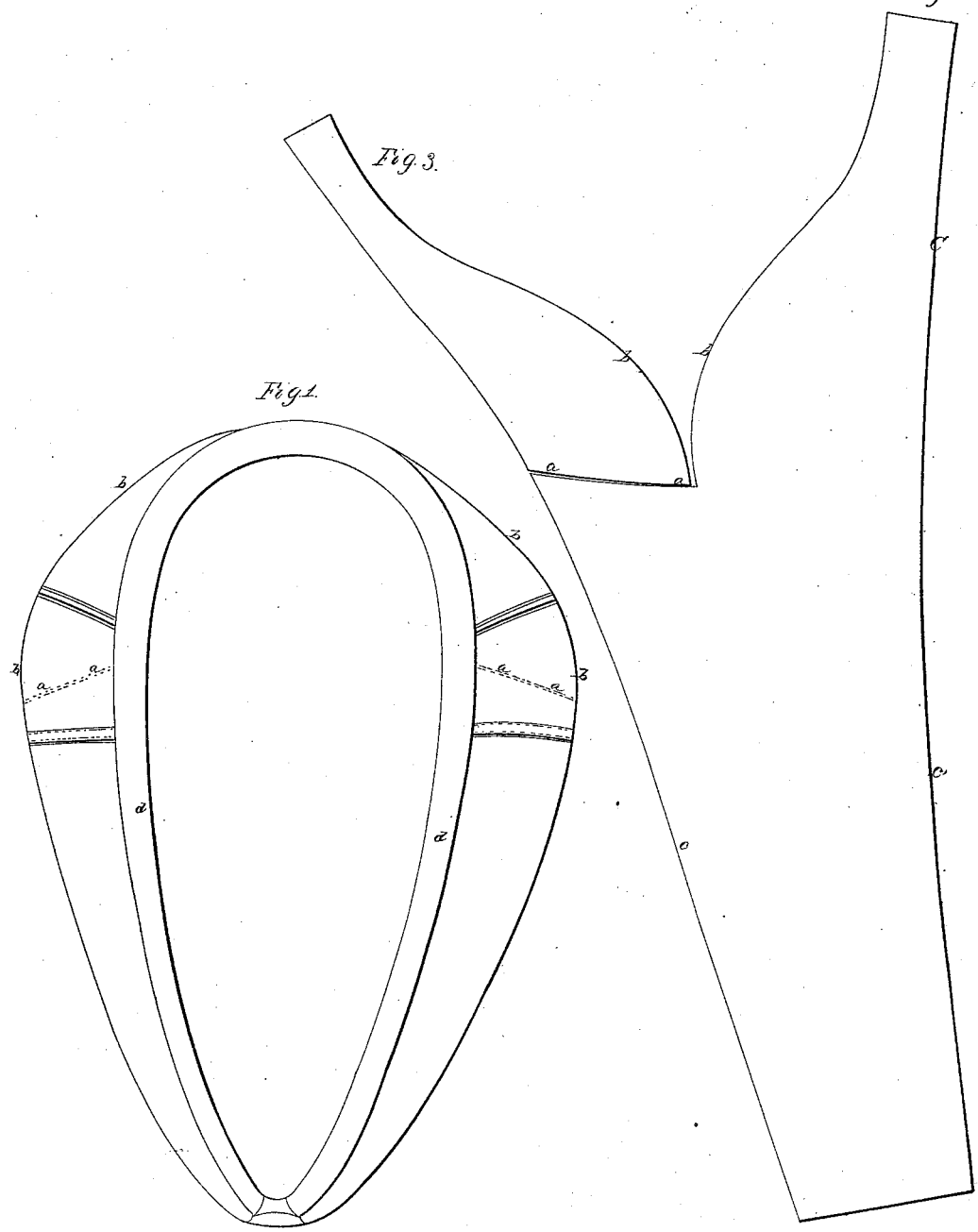

UNITED STATES PATENT OFFICE.

THOMAS PARKINSON, OF SPARTA, NEW YORK.

MODE OF CUTTING THE LEATHER FOR HORSE-COLLARS.

Specification of Letters Patent No. 2,183, dated July 17, 1841.

*To all whom it may concern:*

Be it known that I, THOMAS PARKINSON, of Sparta, in the county of Livingston and State of New York, have invented a new and useful Improvement in the Manufacturing of Collars for Horses, which improvement consists in the particular form or pattern to which I cut the leather used for the covering of said collars; and I do hereby declare that the following is a full and exact description thereof.

In the accompanying drawing Figure 1, is a representation of a finished collar, and Figs. 2 and 3 represent the pattern by which I cut the leather, these two pieces when properly united by sewing constituting the covering of one half, or side, of the collar.

There is not any novelty whatever in the mere forming of the covering of one half of the collar from two pieces of leather, but the novelty is in my manner of cutting the leather in the particular form adopted by me, and by which a great saving is effected in the use of that material, to the amount of at least twenty five per cent. The pieces shown in Figs. 2 and 3, are drawn to a larger scale than the collar Fig. 1, and these must, of course, in all cases, be adapted to the size of the collar to be made, but the respective parts will be in the proportions represented. The pieces Figs. 2 and 3, are to be sewn together in the line $a$, $a$, and will, on the collar form a seam the situation of which is shown by the dotted lines $a$, $a$, Fig. 1; these seams being each covered by a piece of leather, such as is usually employed to cover and strengthen this part of the collar. After sewing or stitching the two pieces Figs. 2 and 3, together in the line $a$, $a$, they are then united in the same manner along the lines $b$, $b$; the outer edges $c$, $c$, $c'$, $c'$, are then, in the ordinary manner, sewn or stitched together and the covering of one half of the collar will be thus completed. The seam formed by the joining of the edges $c$, $c$, and $c'$, $c'$, is situated at the junction of the roll, or portion $d$, $d$, Fig. 1, with the body of the collar, which is made in the usual way.

Having thus described the nature of my invention, and shown the manner in which the same is to be carried into effect, what I claim as new, and desire to secure by Letters Patent, is—

The cutting of the leather which is to constitute the covering of the collar, to a pattern constructed in the manner, of the two pieces represented by the Figs. 2, and 3, in the accompanying drawing; preserving in all variations of size, the relative proportions of the respective parts, as herein shown and made known.

THOMAS PARKINSON.

Witnesses:
   THOS. P. JONES,
   GEORGE WEST.